April 1, 1969    A. STANFORD    3,436,525
ELECTRICALLY HEATED DISH-DISPENSING APPARATUS
Filed Oct. 21, 1965
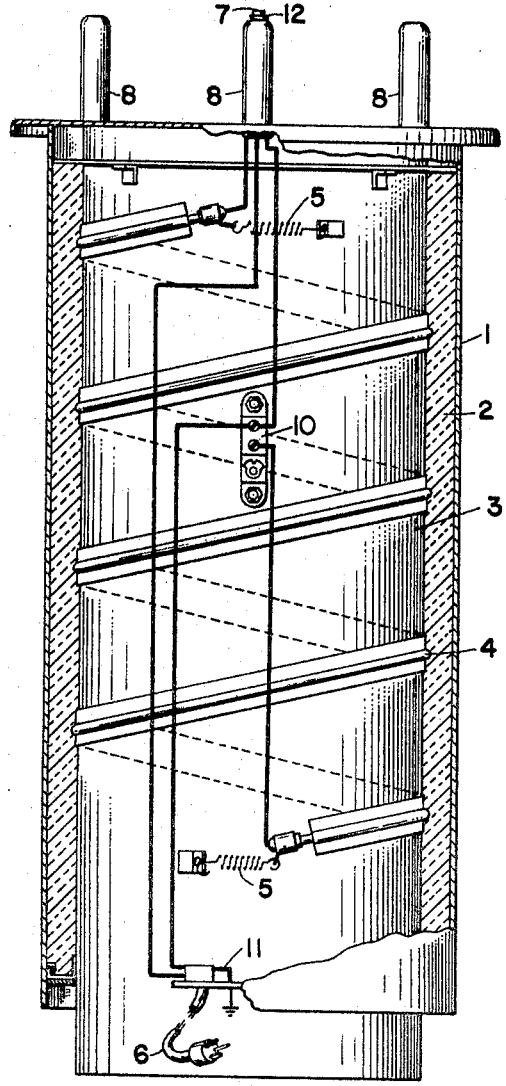
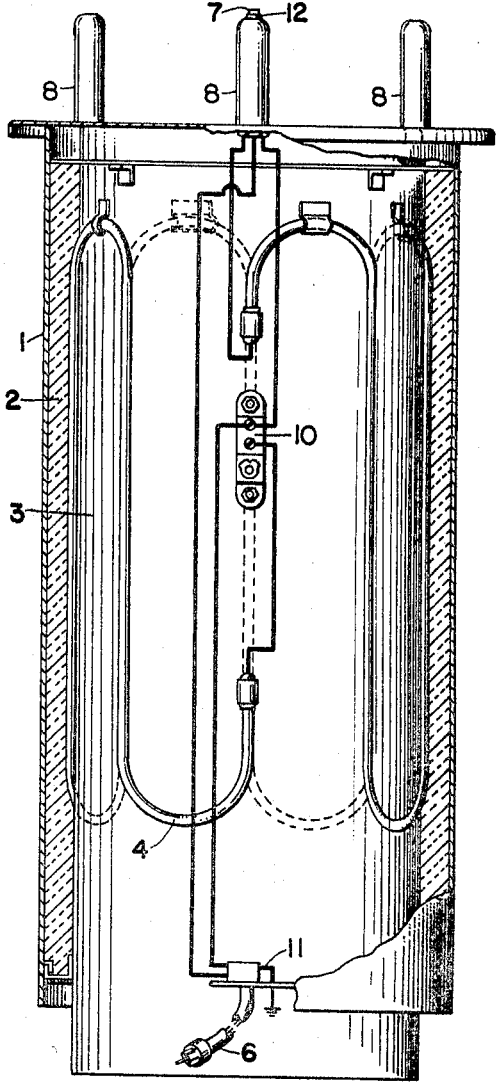
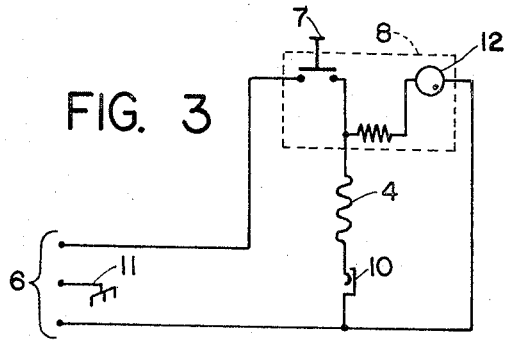
INVENTOR.
ARTHUR STANFORD United States Patent Office 3,436,525
Patented Apr. 1, 1969

3,436,525
ELECTRICALLY HEATED DISH-DISPENSING APPARATUS
Arthur Stanford, Richmond, Va., assignor to American Machine & Foundry Company, a corporation of New Jersey
Filed Oct. 21, 1965, Ser. No. 499,512
Claims priority, application Great Britain, June 9, 1965, 24,384/65
Int. Cl. F27d 11/02
U.S. Cl. 219—385          2 Claims

ABSTRACT OF THE DISCLOSURE

A vertical stacked-article dispenser has tubular inner and outer housings arranged to form an annular space therebetween. A flexible electrical heating element is freely slidably disposed in a reflexed serpentine pattern, either zig-zag or as a helix or spiral, against the outer surface of the inner housing. At least one end of the helically or spirally disposed heating element is anchored by spring means to the inner housing. The annular space is filled with glass fiber insulation. A thermostatic switch responsive to the temperature of the inner housing and a manual off-on switch application of power to the heating element.

---

This invention relates to temperature controlled self-levelling, storing and dispensing systems of the type described in U.S. Patent No. 3,004,813 issued Oct. 17, 1961 to H. L. Shivek.

These systems are used in restaurants, cafeterias and factories to dispense dishes, trays, cups, work parts and even packaged food at a preselected convenient height.

Briefly, such a device comprises a housing in which a vertically moveable work carrier is driven by a spring or counterweight. This is the dispensing mechanism. Items to be dispensed are stacked or arranged in layers and as items are removed serially from the top other items move up to occupy the position vacated. Commonly a tubular housing stores the items dispensed.

The present invention relates to regulation of the temperature of items so stored and dispensed. In known systems a band or ribbon heating element is fixed radially around the housing and causes irregular heating of the interior. In known systems the conducting properties of the material from which the housing is made are relied upon to distribute heat to the stored articles.

One problem with the prior art heating element is that the dispenser housing wall develops hot spots.

In accordance with one embodiment of the present invention, hot spots in the dispensing housing wall are minimized by using a longitudinally expansible and longitudinally flexible heating element which provides a substantially uniform temperature, a uniform bearing pressure and uniform heat flow to the outer surface of the housing.

Accordingly, it is one object of the invention to eliminate hot spots in a temperature-controlled dispenser housing.

To the fulfillment of this and other objects, the invention provides a vertical stacked-article dispenser comprising an outer tubular housing, an inner rigid tube disposed inside said outer tube and having an open upper end wall portion and a closed lower end wall portion together forming an annular space therebetween, insulation material disposed in and substantially filling said space, a flexible electrical-resistance heating element having an intermediate portion wrapped spirally in turns around said inner rigid tube and a first end portion having a non-conductive connection to one of said end walls and a second end portion having a resilient non-conductive connection the other of said end walls, and an electrical power supply connecting to said element end portions.

As will be seen in the drawing:
FIG. 1 is a cut away view in partial section of a system according to a first preferred form of the invention in which a spiral linear heating element is used;
FIG. 2 is a cut away view in partial section of a system according to a second embodiment in which a vertically disposed zig-zag heater element is used in a serpentine pattern over the surface of a dispenser housing;
FIG. 3 is a schematic diagram of the wiring of the system of FIG. 1.

The present type of heated dispenser tube is useful to heat dishes and cups, prior to use, to prevent chilling of food served therein. The present method and system for temperature control differs from band or ribbon heaters strapped radially around the tube or housing in that it is uniformly distributed and is not merely conducted a long distance over the housing surface. Hot spots are avoided. In the present case a reflexed continuous linear element covers most of the storage container surface between the vertical extremities of said element. One or more springs or clamps may be used to hold a heating element against the housing as the apparatus expands or contracts in operation. This overall coverage allows operation at less extreme temperature than would be needed with a band or ribbon type to deliver adaquate heat to remote parts of the equipment and provides a more uniform heat without surface hot spots.

Coils containing refrigerant or heated fluid can be substituted for the electric resistance elements, disclosed and preferred, or combined therewith. Thus, cold crockery for ice cream and the like may be handled.

In the drawing, an outer tubular metal, preferably steel, housing 1 having an open upper end wall portion and a closed lower end wall portion is provided with a thermal insulation layer or space 2 which may be glass fibers and an inner rigid tube 3, preferably of steel, to which a flexible electric resistance heating element 4 is applied in a reflexed serpentine pattern, either zig-zag as in FIGURE 2 or helical and spiral as in FIGURE 1. The heating element 4 may be anchored through a spring 5 against the housing. The heating element 4, as illustrated, is anchored with a non-conductive connection, that is, spring 5. However, it is to be understood that at one end the non-conductive connection may be either resilient or non-resilient. In any event it is resilient at the opposite end such as shown by spring 5. Electric power is supplied through a wire 6 across a switch 7 located on a storage guide element 8 which may be illuminated by a bulb 12 to show the flow of current. A thermostatic switch element 10 senses and maintains a selected temperature. This may be adjustable or preset as to temperature range. The wiring system shown schematically in FIGURE 3 may be connected through a junction block and preferably includes a grounded connection 11 for safety. Similar reference characters correspond on different parts of the drawing.

What is claimed is:
1. A vertical stacked article dispenser comprising: an outer tubular housing; an inner rigid tube disposed inside said outer tubular housing and having an open upper end wall portion and a closed lower end wall portion together forming an annular space there between; insulation material disposed in and substantially filling said space; a flexible electrical-resistance heating element having an intermediate portion wrapped spirally in turns around said inner rigid tube and being freely slidable with respect to said inner rigid tube, the heating element having a first end portion having a non-conductive connection to one of said end wall portions and a second end portion having means providing a stretched resilient non-conductive connection to the other of said end wall portions; and an electrical power supply connecting to said element end portions having an automatic temperature control with a temperature sensor contacting and sensing the inner tube.

2. A vertical stacked article dispenser comprising: an outer tubular housing; an inner rigid tube disposed inside said outer tubular housing and having an open upper end wall portion and a closed lower end wall portion together forming an annular space there between; insulation material disposed in and substantially filling said space; a flexible electrical-resistance heating element having an intermediate portion wrapped spirally in turns around said inner rigid tube and being freely slidable with respect to said inner rigid tube, the heating element having a first end portion having a non-conductive connection to one of said end wall portions and a second end portion having means providing a stretched resilient non-conductive connection to the other of said end wall portions; and an electrical power supply connecting to said element end portions having an automatic temperature control with a temperature sensor contacting and sensing the inner tube, the open upper end wall portion having a plurality of vertical storage guide elements, and the power supply including an operation signal light and control switch disposed in and cooperating with one of the guide elements.

References Cited

UNITED STATES PATENTS

| | | | |
|---|---|---|---|
| 2,982,932 | 5/1961 | Morey | 219—528 X |
| 3,253,122 | 5/1966 | Kochmer et al. | 219—542 X |
| 3,351,741 | 11/1967 | Shelley | 219—535 X |
| 2,748,252 | 5/1956 | Williams et al. | 219—535 |
| 3,030,483 | 4/1962 | Rudolph et al. | 219—214 |
| 3,190,453 | 6/1965 | Shelley. | |

ANTHONY BARTIS, *Primary Examiner.*

U.S. Cl. X.R.

219—214, 311, 406, 535, 536; 221—150; 312—71, 236